(12) United States Patent
Subramaniyan et al.

(10) Patent No.: US 10,342,069 B2
(45) Date of Patent: Jul. 2, 2019

(54) BEACON CONTROL SYSTEM AND METHOD

(71) Applicant: Qubercomm Technologies, Inc., Walnut, CA (US)

(72) Inventors: Sundar Subramaniyan, Chennai (IN); Senthil Kumar Balasubramanian, Chennai (IN)

(73) Assignee: QUBERCOMM TECHNOLOGIES, INC, Walnut, CA (US)

( * ) Notice: Subject to any disclaimer, the term of this patent is extended or adjusted under 35 U.S.C. 154(b) by 72 days.

(21) Appl. No.: 15/630,895

(22) Filed: Jun. 22, 2017

(65) Prior Publication Data

US 2018/0176983 A1    Jun. 21, 2018

(30) Foreign Application Priority Data

Dec. 20, 2016   (IN) .............................. 201621043536

(51) Int. Cl.
  H04W 84/20       (2009.01)
  H04J 3/06        (2006.01)
  H04W 48/06       (2009.01)
  H04W 4/18        (2009.01)
  H04W 48/08       (2009.01)

(52) U.S. Cl.
  CPC .......... *H04W 84/20* (2013.01); *H04J 3/0661* (2013.01); *H04W 4/185* (2013.01); *H04W 48/06* (2013.01); *H04W 48/08* (2013.01)

(58) Field of Classification Search
  CPC ...... H04W 84/20; H04W 4/185; H04W 48/06
  See application file for complete search history.

(56) References Cited

U.S. PATENT DOCUMENTS

| | | | |
|---|---|---|---|
| 7,333,460 B2 | 2/2008 | Vaisanen et al. | |
| 2016/0110782 A1* | 4/2016 | Tadajewski | G06Q 30/0601 705/14.37 |
| 2016/0227000 A1* | 8/2016 | Tsuchida | H04L 67/42 |
| 2016/0323812 A1* | 11/2016 | Moon | H04W 48/10 |
| 2017/0085393 A1* | 3/2017 | Tobella | H04L 12/2818 |

FOREIGN PATENT DOCUMENTS

WO    2015098448    7/2015

OTHER PUBLICATIONS

Estimote Wojtek Borowicz, "What's the battery life of Estimote Beacons? Can I optimize it?", Jun. 24, 2016.

* cited by examiner

*Primary Examiner* — Zhiren Qin
(74) *Attorney, Agent, or Firm* — HM Law Group LLP; Vani Moodley, Esq.

(57) ABSTRACT

Disclosed is a method and system for controlling one or more beacon devices. In one implementation, the method comprises receiving a list of users connected to an access point and a list of beacon devices located within predefined distance from the access point and identifying a total number of users from the list of users utilizing a predefined service. Further, the method comprises generating a command based on comparison of the total number of users and a predefined threshold. The method furthermore comprises, transmitting the command to the one or more beacon devices, from the list of beacon devices, for one of a) activating the beacon devices, b) modifying a time interval between two consecutive beacons transmitted by the one or more beacon devices, or c) deactivating the beacon devices, thereby controlling the one or more beacon devices.

10 Claims, 4 Drawing Sheets

BEACON CONTROL SYSTEM AND METHOD

CROSS REFERENCE TO RELATED APPLICATIONS AND PRIORITY

The present application claims priority from Indian Patent Application No. 201621043536 filed on 20 Dec. 2016 the entirety of which is hereby incorporated by reference.

TECHNICAL FIELD

The present subject matter described herein, in general, relates to a control system and method, and more particularly a system and a method for controlling one or more beacon devices.

BACKGROUND

Nowadays, beacon devices are installed at supermarkets, convenience stores, department stores, and other place to transmit, data related to product, coupons, discounts, offers and the like to mobile devices, which is further processed and displayed to the user. Typically, the beacons devices continuously transmit a beacon signal at a predetermined period, for performing a wireless connection between the mobile device and the beacon device and transmitting data. In particular beacon devices uses Bluetooth to transmit a universally unique identifier and other data picked up by a compatible app or operating system installed on the mobile devices. Generally, the beacon devices powered with a battery such as a coin cell battery, which has to be changed periodically.

Conventionally, the beacon devices continuously beacon in a periodic manner irrespective of any users in its vicinity or without ascertaining if application or user is utilizing the data being beaconed. For example, at night when no mobile devices are around the beacon devices, the beacon devices continue beaconing. Thus resulting in loss of power and reduction in battery life. Conventionally, in order to increase the battery life of the beacon devices, the beacon devices are switched off manually, for example at night. Some other conventional system and methods, utilized thermal sensors or proximity sensors and the like to identify users in the vicinity to switch off the beacon devices. Such conventional system and methods keep the beacon devices active when users are in the vicinity of the beacon devices but are not utilizing the data being beaconed by the beacon devices, resulting in power wastage. Thus, there exists a need for a system and method to enable effective control of beacon devices.

SUMMARY

Before the present systems and methods for controlling one or more beacon devices, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application. This summary is provided to introduce aspects related to a system and a method for controlling one or more beacon devices. This summary is not intended to identify essential features of the claimed subject matter nor is it intended for use in determining or limiting the scope of the claimed subject matter.

In one implementation, a system for controlling one or more beacon devices is disclosed. In one aspect, the system comprises a memory and a processor coupled to the memory. Further, the processor may be capable of executing instructions in the memory to perform one or more steps. In the aspect, the system may receive a list of users connected to an access point and a list of beacon devices located within predefined distance from the access point. Upon receiving the system may identify a total number of users from the list of users utilizing a predefined service and generate a command based on comparison of the total number of users and a predefined threshold. In one example, the command may comprise one of an activation command, a modification command, and a deactivation command. Further to generating the command, the system may transmit the command to the one or more beacon devices, from the list of beacon devices, for one of a) activating the beacon devices, b) modifying a time interval between two consecutive beacons transmitted by the one or more beacon devices, or c) deactivating the beacon devices, thereby controlling the one or more beacon devices.

In one implementation, a method for controlling one or more beacon devices is disclosed. In one aspect, the method may comprise receiving a list of users connected to an access point and a list of beacon devices located within predefined distance from the access point. The method may further comprise identifying a total number of users from the list of users utilizing a predefined service and generating a command based on comparison of the total number of users and a predefined threshold. In one example, the command comprises one of an activation command, a modification command, and a deactivation command. The method may furthermore comprise transmitting the command to the one or more beacon devices, from the list of beacon devices, for one of a) activating the beacon devices, b) modifying a time interval between two consecutive beacons transmitted by the one or more beacon devices, or c) deactivating the beacon devices, thereby controlling the one or more beacon devices.

In yet another implementation, non-transitory computer readable medium embodying a program executable in a computing device for controlling one or more beacon devices is disclosed. In one aspect, the program may comprise a program code for receiving a list of users connected to an access point and a list of beacon devices located within predefined distance from the access point. The program may comprise a program code for identifying a total number of users from the list of users utilizing a predefined service. The program may comprise a program code for generating a command based on comparison of the total number of users and a predefined threshold the command comprises, for example one of an activation command, a modification command, and a deactivation command. The program may comprise a program code for transmitting the command to the one or more beacon devices, from the list of beacon devices, for one of a) activating the beacon devices, b) modifying a time interval between two consecutive beacons transmitted by the one or more beacon devices, or c) deactivating the beacon devices, thereby controlling the one or more beacon devices.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system for controlling one or more beacon devices disclosed in the document and the figures.

The present subject matter is described detail with reference to the accompanying figures. In the figures, the leftmost digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for controlling one or more beacon devices, similar or equivalent to those described herein can be used in the practice or testing of embodiments of the present disclosure, the exemplary, systems and methods for controlling one or more beacon devices are now described. The disclosed embodiments for controlling one or more beacon devices are merely examples of the disclosure, which may be embodied in various forms.

Various modifications to the embodiment will be readily apparent to those skilled in the art and the generic principles herein may be applied to other embodiments for controlling one or more beacon devices. However, one of ordinary skill in the art will readily recognize that the present disclosure for controlling one or more beacon devices is not intended to be limited to the embodiments described, but is to be accorded the widest scope consistent with the principles and features described herein.

In an implementation, a system and method for controlling one or more beacon devices, is described. In an embodiment a list of users connected to an access point and a list of beacon devices located within predefined distance from the access point is received. In one implementation, the access point may also be understood as or to comprise a computing device such as wireless access point, Mobile Software Access Point, Hotspot, IoT (Internet of Things) Gateway, IoE (Internet of Everything) Gateway & Controller and the like. Upon receiving the list, a total number of users from the list of users utilizing a predefined service are identified and a command is generated based on comparison of the total number of users and a predefined threshold. In one example, the command may comprise one of an activation command, a modification command, and a deactivation command. Further to generating the command, the command may be transmitted to the one or more beacon devices, from the list of beacon devices, for one of a) activating the beacon devices, b) modifying a time interval between two consecutive beacons transmitted by the one or more beacon devices, or c) deactivating the beacon devices, thereby controlling the one or more beacon devices.

Figure 1:
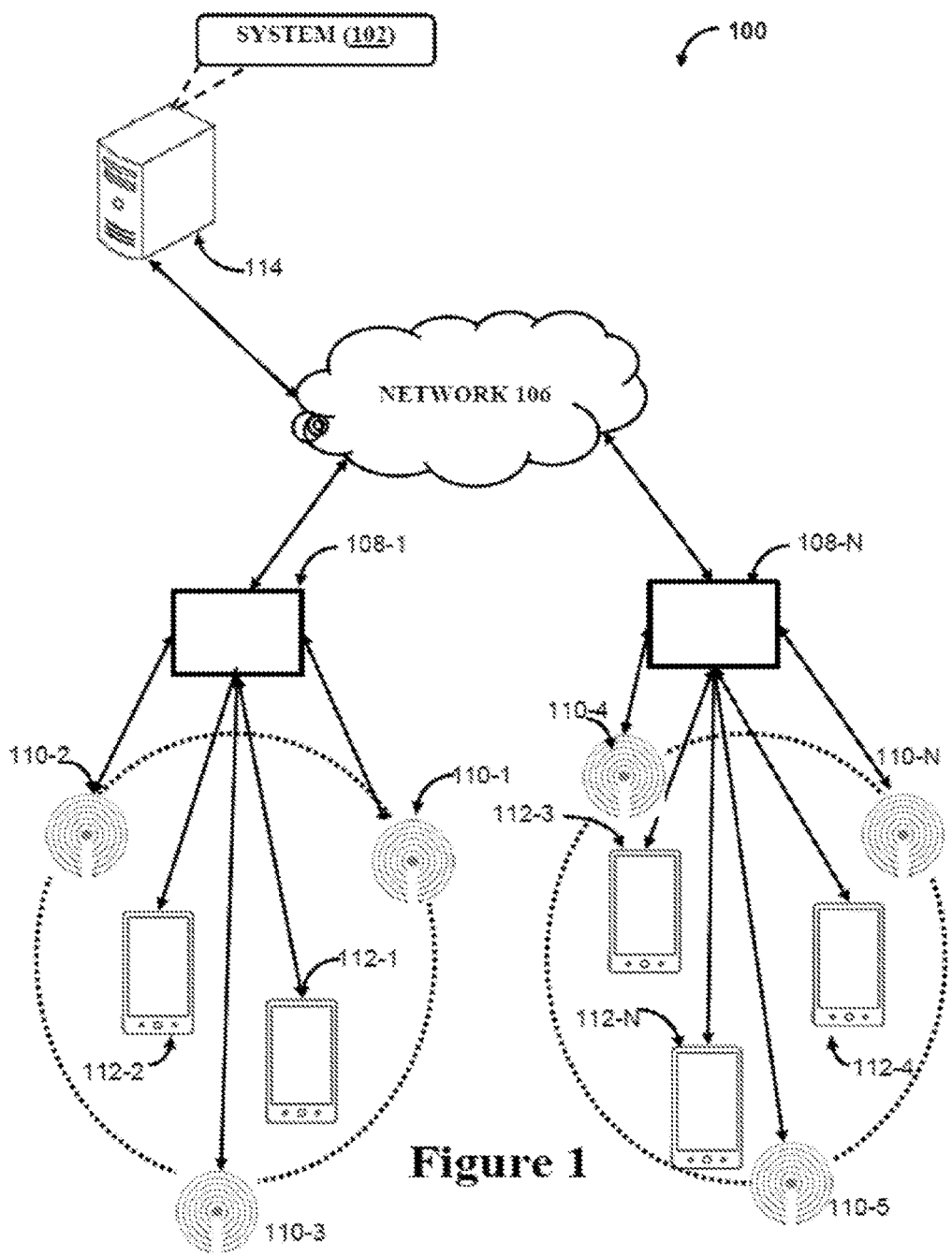
FIG. 1 illustrates a network implementation of a system for controlling one or more beacon devices, in accordance with an embodiment of the present subject matter.

Referring now to FIG. 1, a network implementation 100 of a system 102 for controlling one or more beacon devices 110-1, 110-2 . . . 110-N, in accordance with an embodiment of the present subject matter may be described. In one embodiment, the present subject matter is explained considering that the system 102 is implemented on a server 114 and connected to the network 106. It may be understood that the system 102 may also be implemented in a variety of computing systems, such as a laptop computer, a desktop computer, a notebook, a workstation, a mainframe computer, a server, a network server, a cloud-based computing environment, or an access point 108-1 . . . 108-N and the like. In one implementation, the access point 108-1 . . . 108-N may also be understood as or to comprise a computing device such as wireless access point, Mobile Software Access Point, Hotspot, IoT (Internet of Things) Gateway, IoE (Internet of Everything) Gateway & Controller and the like. In other example, the system 102 may be installed within access points 108-1 . . . 108-N connected to a network 106. In one embodiment, the system 100 may be communicatively coupled to one or access points 108-1 . . . 108-N and beacon devices 110-1, 110-2 . . . 110-N in a location. In one implementation the access points 108-1 . . . 108-N (herein after individually and collectively referred to as access point(s) 112) may further comprise be Wi-Fi for internet and Bluetooth low energy device for communication. In one example, the beacon devices 110-1, 110-2 . . . 110-N may be preconfigured to transmit data to one or more mobile devices 112-1 . . . 112-N.

In one example, mobile devices 112-1 . . . 112-N (herein after individually and collectively referred to as mobile device(s) 112) may be a mobile phone or a laptop or like devices capable to communicate with the beacon devices 110-1, 110-2 . . . 110-N (herein after individually and collectively referred to as beacon device(s) 110). In one example, the beacon device(s) 110 may be a Bluetooth low energy devices. It may also be understood that the system 102 supports a plurality of browsers and all viewports. Examples of the plurality of browsers may include, but not limited to, Chrome™, Mozilla™, Internet Explorer™, Safari™, and Opera™. Furthermore, the system 102 may be communicatively coupled to a database for storing data. In one example, the database may be any of the relationship database and the like.

In one implementation, the network 106 may be a wireless network, a wired network or a combination thereof. The network 106 can be implemented as one of the different types of networks, such as intranet, local area network (LAN), Wireless Personal Area Network (WPAN), Wireless Local Area Network (WLAN), wide area network (WAN), the internet, and the like. The network 106 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment of the present subject matter, the system 102 may receive a list of users connected via the mobile device 112 to an access point 108 and a list of beacon devices 110 located within predefined distance from the access point 108. Upon receiving, the system 102 may identify a total number of users from the list of users utilizing a predefined service or a predefined application such as location service or e-commerce application. Further to identifying the total number of users the system 102 generate a command based on comparison of the total number of users and a predefined threshold. In one example the predefined threshold may be 0 (zero). In one more example, the command may comprise one of an activation command, a modification command, and a deactivation command Subsequent to generating, the system 102 may transmit the command to the one or more beacon devices 110 via the access point 108, from the list of beacon devices, for one of a) activating the beacon devices, b) modifying a time interval between two consecutive beacons transmitted by the one or more beacon devices, or c) deactivating the beacon devices, thereby controlling the one or more beacon devices.

In one more implementation example of the present subject matter construes a shopping mall with beacon devices installed. In this example, users may utilize the beacons transmitted from the beacon devices 110 to obtain mall internal location and navigation services. Further, in the example, the system 102 may receive a list of users via the mobile device 112 connected to an access point 108 and a list of beacon devices 110 located within a predefined distance of the access point and connected to the access point. Upon receiving, the system 102 may identify the total number of users obtaining mall internal location and navigation services. Further the system 102 may compare the total number of users with a predefined threshold for example 0 (zero). In one example, if the total number is greater than zero the system 102 may transmit generate and transmit an activation command for activating deactivated beacon devices 110 or maintain the active status of the active beacon devices 110. In other example, if the total number of users is less than zero or other predefined threshold such as 5 (five) then the system 102 may analyse the time interval between two consecutive beacons transmitted by the beacon devices 110 and a predefined threshold for example 100 milliseconds. In one condition if the time interval between two consecutive beacons is less than 100 milliseconds, then the system 102 may generate and transmit a modification command to modify, for example increase, the time interval. In other condition, if the time interval is greater than 100 milliseconds, then the system 102 may generate and transmit a deactivation command for deactivating activated beacon devices 110 or maintain the deactivated status of the deactivated beacon devices 110. Thereby the system 102 controls the one or more beacon devices. Further, it may be understood that the applications of system(s) 102 and its methods are not only limited to the shopping mall, as described above, but may also be used in any other locations such as stadiums, buildings, housing societies, resorts, theme/amusement parks, corporate offices, casinos and the likes, where people have a need to use a particular service such as location service.

Figure 2:
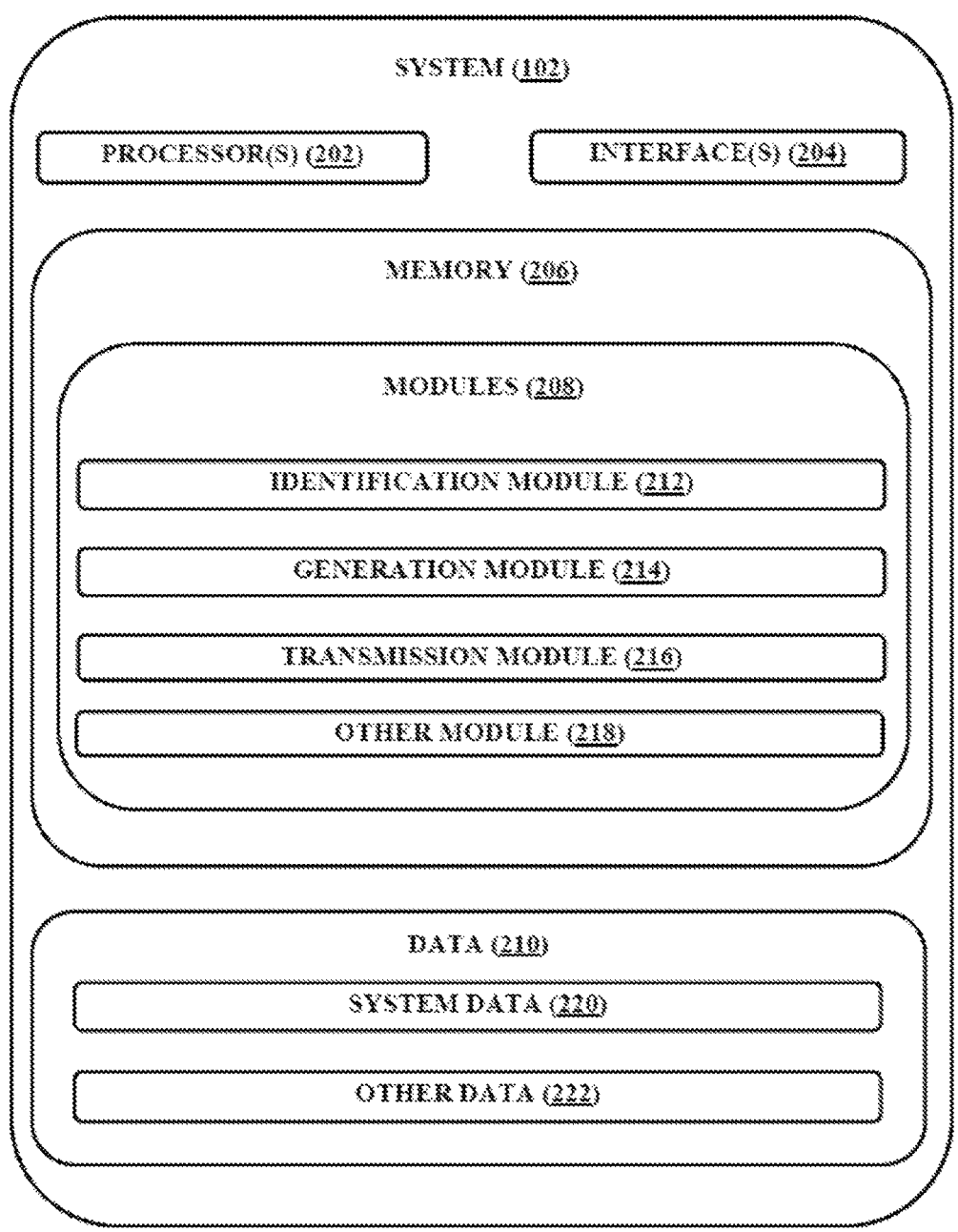
FIG. 2 illustrates the system and its subcomponents for controlling one or more beacon devices, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, FPGAs, PLDs and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, GSM or CDMA cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an identification module 212, a generation module 214, a transmission module 216 and other module 218. The other modules 218 may include programs or coded instructions that supplement applications and functions of the system 102. The modules 208 described herein may be implemented as software modules that may be executed in the cloud-based computing environment of the system 102.

The memory 206, amongst other things, serves as a repository for storing data processed, received, and generated by one or more of the modules 208. The memory 206 may include data generated as a result of the execution of one or more modules in the other module 220. In one implementation, the memory may include data 210. Further, the data 210 may include a system data 220 for storing data processed, computed received and generated by one or more of the modules 208. Furthermore, the data 210 may include other data 222 for storing data generated as a result of the execution of one or more modules in the other module 218.

In one implementation, at first, a user may access the system 102 via the I/O interface 204. The user may register using the I/O interface 204 in order to use the system 102. In one aspect, the user may access the I/O interface 204 of the system 102 for obtaining information, providing input information or configuring the system 102.

IDENTIFICATION MODULE 212

Referring to FIG. 2, in an embodiment the identification module 212 may receive a list of users connected to an access point and a list of beacon devices located within predefined distance from the access point. In one implementation, the access point may also be understood as or to comprise a computing device such as wireless access point, Mobile Software Access Point, Hotspot, IoT (Internet of Things) Gateway, IoE (Internet of Everything) Gateway & Controller and the like. The identification module 212 may list of users connected to an access point and the list of beacon devices in the system data 220. Upon receiving, the system may identify a total number of users from the list of users utilizing a predefined service. Further, the system may store the total number in the system 220.

In the embodiment, upon identifying the total number of users, the identification module 212 may generate a second set of user in the vicinity of the access point but not connected to the access point and utilizing the predefined service, for example, through mobile data such 3G, 4G. In one example, the identification module 212 may generate second set of user utilizing one or more sensors such as proximity sensors, high precision far field microphones, light sensors and the like. Further to generating, the identification module 212 may update the total number of users to include the second set of users. Furthermore, the identification module 212 may store the updated total number in the system 220.

GENERATION MODULE 214

Further in the embodiment, identifying the total number of users, the generation 214 module may generate a command In one example, the generation 214 module may generate the command based on comparison of the total number of users and a predefined threshold. In one example, the command may comprise one of an activation command, a modification command, and a deactivation command. Further, the modification command may comprise instructions to increase or decrease the time interval between two consecutive beacons transmitted by the beacon device and the deactivation command comprises instructions to one of switch off the beacon device or switch to an only receiving mode.

TRANSMISSION MODULE 216

In the embodiment upon generating the command, the transmission module 216 transmit the command to the one or more beacon devices, from the list of beacon devices, for one of a) activating the beacon devices, b) modifying a time interval between two consecutive beacons transmitted by the one or more beacon devices, or c) deactivating the beacon devices, thereby controlling the one or more beacon devices. In one example, the transmission module 216 may transmit the command via the access point using the Bluetooth low energy device.

Exemplary embodiments for controlling one or more beacon devices discussed above may provide certain advantages. Though not required to practice aspects of the disclosure, these advantages may include those provided by the following features.

Some embodiments of the system and the method enable battery optimization.

Some embodiments of the system and the method reduce power consumption of beacon devices.

Some embodiments of the system and the method enable controlling of beacon devices based on utilization of predefined service.

Some embodiments of the system and the method enable effective and real time control and management of beacon devices.

Figure 3:
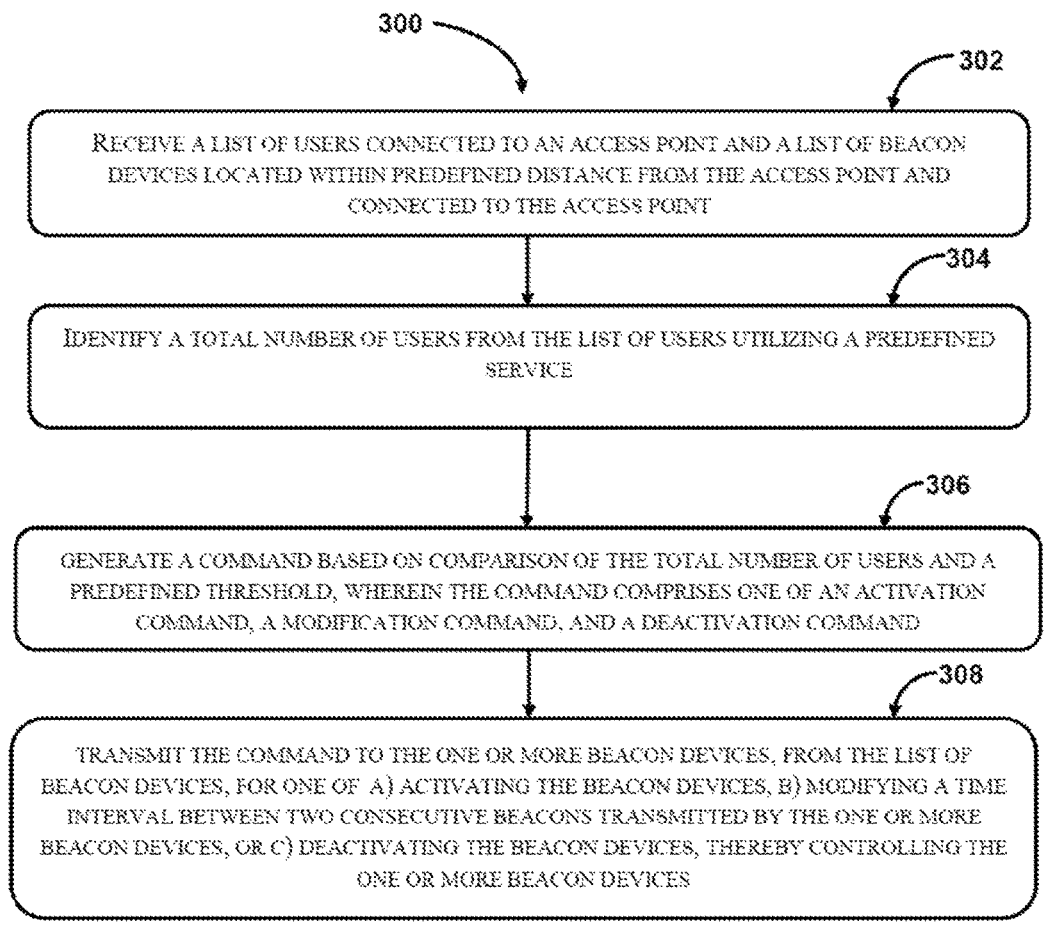
FIG. 3 illustrates a method for controlling one or more beacon devices, in accordance with an embodiment of the present subject matter.

Referring now to FIG. 3, a method 300 for controlling one or more beacon devices is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 for controlling one or more beacon devices as described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, a list of users connected to an access point and a list of beacon devices located within predefined distance from the access point may be received. In an implementation, the identification module 212 may a list of users connected to an access point and a list of beacon devices located within predefined distance from the access point. Further the identification module 212 may store the lists in the system data 220.

At block 304, a total number of users from the list of users utilizing a predefined service are identified. In an implementation, the identification module 212 may a total number of users from the list of users utilizing a predefined service and may store the total number of users in the system data 220.

At block 306, a command based on comparison of the total number of users and a predefined threshold is generated. Further, the command may comprise one of an activation command, a modification command, and a deactivation command In the implementation, the generation module 214 may generate a command based on comparison of the total number of users and a predefined threshold and store the command in the system data 220.

At block 308, the command may be transmitted to the one or more beacon devices, from the list of beacon devices, for one of a) activating the beacon devices, b) modifying a time interval between two consecutive beacons transmitted by the one or more beacon devices, or c) deactivating the beacon devices, thereby controlling the one or more beacon devices. In the implementation, the transmission module 216 may transmit the command to one or more devices, via an access point using a Bluetooth low energy device controlling the one or more beacon devices the beacon devices.

Figure 4:
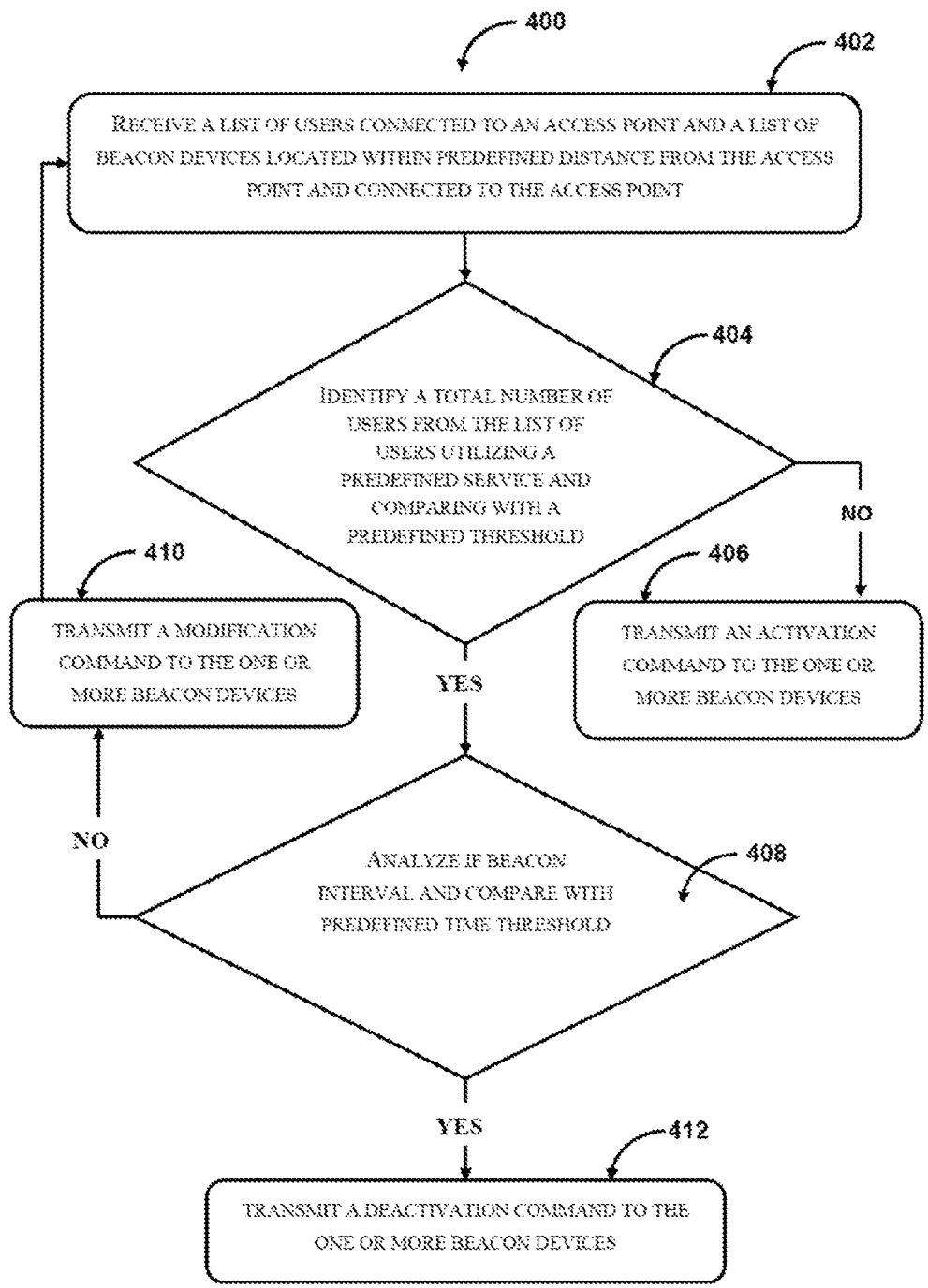
FIG. 4 illustrates one more embodiment of a method for controlling one or more beacon devices, in accordance with an embodiment of the present subject matter.

Referring now to FIG. 4, a method 400 for controlling one or more beacon devices is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types.

The order in which the method 400 for controlling one or more beacon devices as described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 402, a list of users connected to an access point and a list of beacon devices located within predefined distance from the access point is received.

At block 404, a total number of users from the list of users utilizing a predefined service are identified. Further, the total number of users is compared to a predefined.

At block 406, an activation command to the one or more beacon devices is transmitted if the total number of users is greater that the predefined threshold.

At block 408, a time interval between two consecutive beacons emitted by the beacon device (alternatively referred to as beacon interval) is analysed and compared to a predefined time threshold, if the total number of users is greater that the predefined threshold.

At block 410, a modification command for modifying the time interval between two consecutive beacons is transmitted to the one or more beacon devices, if the time interval is within the predefined time threshold.

At block 412, a deactivation command is transmitted to the one or more beacon devices if the time interval is outside the predefined time threshold, thereby controlling the one or more beacon devices.

Exemplary embodiments discussed above may provide certain advantages. Though not required to practice aspects of the disclosure, these advantages may include a method and system for controlling one or more beacon devices. Although implementations for methods and systems for controlling one or more beacon devices have been described in language specific to structural features and/or methods, it is to be understood that the appended claims are not necessarily limited to the specific features or methods described. Rather, the specific features and methods are disclosed as examples of implementations for controlling one or more beacon devices.

We claim:

1. A method for controlling one or more beacon devices, the method comprising:
   receiving, by a processor, a list of users connected to an access point and a list of beacon devices located within predefined distance from the access point;
   identifying, by the processor, a total number of users from the list of users utilizing a predefined service;
   generating, by the processor, a second set of user in the vicinity of the access point but not connected to the access point and utilizing the predefined service;
   updating, by the processor, the total number of users to include the second set of users:
   generating, by the processor, a command based on comparison of the total number of users and a predefined threshold, wherein the command comprises one of an activation command, a modification command, and a deactivation command;
   transmitting, by the processor, the command to the one or more beacon devices, from the list of beacon devices, for one of a) activating the beacon devices, b) modifying a time interval between two consecutive beacons transmitted by the one or more beacon devices, or c) deactivating the beacon devices
   analysing, by the processor, the time interval between two consecutive beacons and the predefined threshold; and
   transmitting, by the processor, one of the modification command and the deactivation command based on the analysis, wherein the modification command is transmitted if the time interval is within the predefined threshold, and the deactivation command is transmitted if the time interval is outside the predefined threshold.

2. The method of claim 1, wherein the modification command comprises instructions to increase or decrease the time interval between two consecutive beacons transmitted by the beacon device.

3. The method of claim 1, wherein the deactivation command comprises instructions to switch off the beacon device or switch to an only receiving mode.

4. The method of claim 1, wherein the access point comprises a Wi-Fi device and Bluetooth low energy device.

5. The method of claim 1, wherein the predefined service comprises location services.

6. A system for controlling one or more beacon devices, the system comprising:
   a memory; and
   a processor coupled to the memory, wherein the processor is capable of executing instructions to perform steps of:
   receiving a list of users connected to an access point and a list of beacon devices located within predefined distance from the access point;
   identifying a total number of users from the list of users utilizing a predefined service;
   generating a second set of user in the vicinity of the access point but not connected to the access point and utilizing the predefined service;
   updating the total number of users to include the second set of users;
   generating a command based on comparison of the total number of users and a predefined threshold, wherein the command comprises one of an activation command, a modification command, and a deactivation command;
   transmitting the command to the one or more beacon devices, from the list of beacon devices, for one of a) activating the beacon devices, b) modifying a time interval between two consecutive beacons transmitted by the one or more beacon devices, or c) deactivating the beacon devices
   analysing the time interval between two consecutive beacons and the predefined threshold; and
   transmitting one of the modification command and the deactivation command based on the analysis, wherein the modification command is transmitted if the time interval is within the predefined threshold, and the deactivation command is transmitted if the time interval is outside the predefined threshold.

7. The system of claim 6, wherein the modification command comprises instructions to increase or decrease the time interval between two consecutive beacons transmitted by the beacon device.

8. The system of claim 6, wherein the deactivation command comprises instructions to one of switch off the beacon device or switch to an only receiving mode.

9. The system of claim 6, wherein the access point comprises a Wi-Fi device and Bluetooth low energy device.

10. The system of claim 6, wherein the predefined service comprises location services.

* * * * *